United States Patent
Khullar et al.

(10) Patent No.: US 12,299,418 B2
(45) Date of Patent: May 13, 2025

(54) STATIC ANALYSIS FOR CLOUD INTEGRATION FLOWS USING MACHINE LEARNING

(71) Applicant: SAP SE, Walldorf (DE)

(72) Inventors: Vipul Khullar, New Delhi (IN); Kirti Sinha, Delhi (IN)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 18/172,854

(22) Filed: Feb. 22, 2023

(65) Prior Publication Data

US 2024/0281221 A1    Aug. 22, 2024

(51) Int. Cl.
*G06F 9/44* (2018.01)
*G06F 8/10* (2018.01)
*G06F 8/34* (2018.01)

(52) U.S. Cl.
CPC . *G06F 8/34* (2013.01); *G06F 8/10* (2013.01)

(58) Field of Classification Search
CPC ........................................................ G06F 8/34
USPC ........................................................ 717/109
See application file for complete search history.

(56) References Cited

U.S. PATENT DOCUMENTS

| | | | |
|---|---|---|---|
| 10,432,707 B2 * | 10/2019 | Hosie | H04L 67/101 |
| 10,726,040 B2 | 7/2020 | Kapoor et al. | |
| 11,195,054 B2 | 12/2021 | Sinha et al. | |
| 11,379,218 B2 | 7/2022 | Khullar | |
| 11,514,044 B2 | 11/2022 | Tiwary et al. | |
| 11,514,275 B2 | 11/2022 | Tiwary et al. | |
| 11,790,224 B2 * | 10/2023 | Modi | G06Q 10/10 706/20 |
| 2020/0177476 A1 * | 6/2020 | Agarwal | G06F 16/27 |
| 2021/0240750 A1 * | 8/2021 | Schwartz | G06F 16/168 |
| 2022/0067207 A1 * | 3/2022 | Lindsay | G06F 40/166 |
| 2022/0318222 A1 | 10/2022 | Khullar et al. | |
| 2022/0405091 A1 | 12/2022 | Mahanta et al. | |

FOREIGN PATENT DOCUMENTS

CN    110688213 A *    1/2020    ...... G06F 9/4881

* cited by examiner

*Primary Examiner* — Evral E Bodden
(74) *Attorney, Agent, or Firm* — Fish & Richardson P.C.

(57) ABSTRACT

In an implementation, a computer-implemented method, includes collecting, as collected integration flows (iFlows), published iFlows. Descriptions of the collected iFlows are extracted as extracted descriptions and the extracted descriptions are parsed. A list of one or more interchangeable operators is created. The collected iFlows are iterated through. Automated performance recommendations for a new iFlow are provided.

18 Claims, 4 Drawing Sheets

STATIC ANALYSIS FOR CLOUD INTEGRATION FLOWS USING MACHINE LEARNING

BACKGROUND

Low-code/no-code (LcNc) tools can simplify development of organizational integration processes for applications, data and processes (for example, cloud computing) through the use of graphical drag-and-drop features to create integration flows (iFlows) using prebuilt integrations. The LcNc tools allow harmonized access to organizational and third-party applications, the ability to design, publish, and manage application programing interfaces (APIs), AI-enabled cloud and hybrid integration development, and a guided systematic approach to define, document, and govern an integration strategy. Performance criterion are an important part of the development of the organizational integration processes.

SUMMARY

The present disclosure describes static analysis for cloud integration flows (iFlows) using machine learning (ML).

In an implementation, a computer-implemented method, comprises: collecting, as collected iFlows, published iFlows; extracting, as extracted descriptions, descriptions of the collected iFlows; parsing the extracted descriptions; creating a list of one or more interchangeable operators; iterating through the collected iFlows; and providing automated performance recommendations for a new iFlow.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described methodology enhances Low-code/no-code (LcNc) tools for cloud-computing iFlow performance enhancement. Second, the described methodology permits ensuring high-reusability, readability, and adherence to naming conventions used for process steps. Third, the LcNc tools are enhanced to provide static analysis for aspects of iFlows (for example, process steps). Fourth, a static check framework for the LcNc tools can statically analyze iFlows and provide pointers on incorrect usage of iFlow steps that might degrade an overall LcNc flow and provide suggestions on appropriate corrective steps. Fifth, the described methodology leverages the published content to train a ML earning model for static analysis. Since, the existing published flows have already been analyzed by experts for best practices during the publishing process, leveraging prior expert analysis is prudent and efficient use of available resources and effort.

The details of one or more implementations of the subject matter of this specification are set forth in the Detailed Description, Claims, and accompanying drawings. Other features, aspects, and advantages of the subject matter will become apparent to those of ordinary skill in the art from the Detailed Description, Claims, and accompanying drawings.

DESCRIPTION OF DRAWINGS

Like reference numbers and designations in the various drawings indicate like elements.

DETAILED DESCRIPTION

Figure 1:
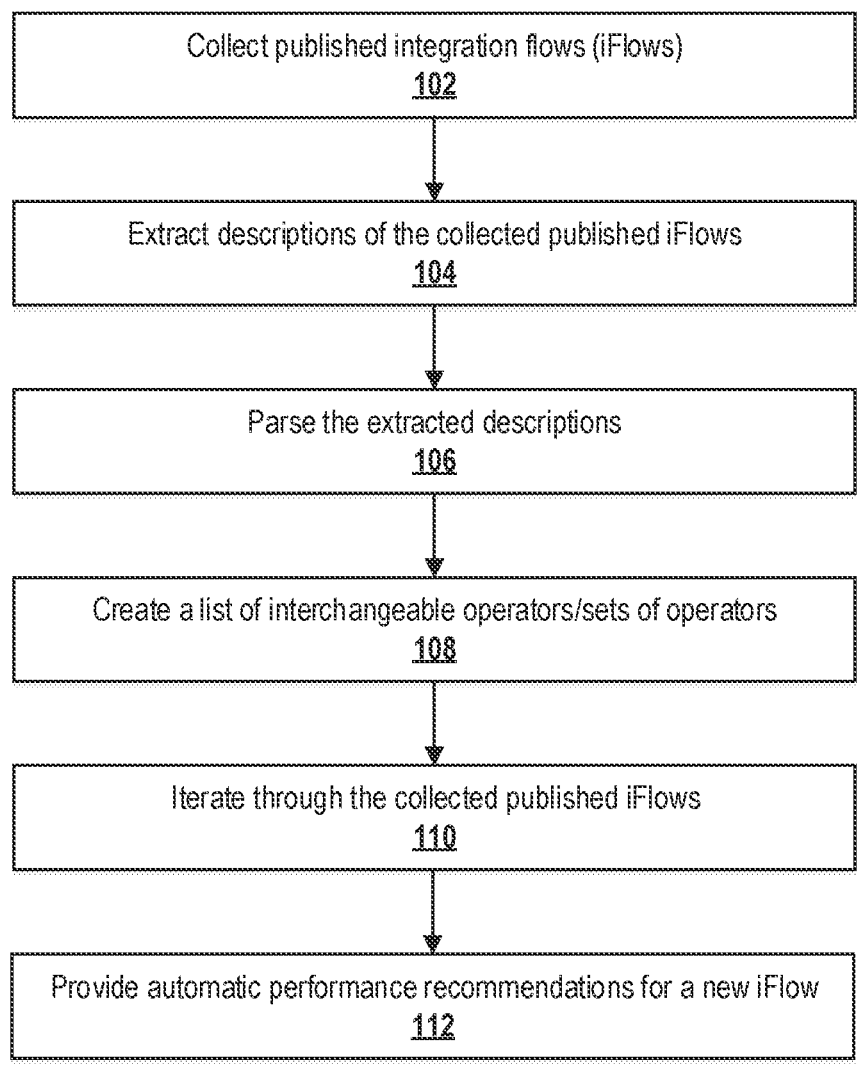
FIG. 1 is a flow chart illustrating an example of a computer-implemented method for generation of performance recommendations, according to an implementation of the present disclosure.

The following detailed description describes static analysis for cloud integration flows (iFlows) using machine learning (ML), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Low-code/no-code (LcNc) tools can simplify development of organizational integration processes for applications, data and processes (for example, cloud computing) through the use of graphical drag-and-drop features to create iFlows using prebuilt integrations. The LcNc tools allow harmonized access to organizational and third-party applications, the ability to design, publish, and manage application programing interfaces (APIs), Artificial intelligence (AI)-enabled cloud and hybrid integration development, and a guided systematic approach to define, document, and govern an integration strategy.

Various criterion are an important part of the development of the organizational integration processes. For example, with respect to performance, there could be several megabytes of data being integrated between two computer systems using iFlows. Reduction of an amount of data or increased network bandwidth can affect overall system performance. Therefore performance is a critical aspect that needs to be evaluated and improved in integration scenarios. Other criterion of importance can include ensuring high-reusability, readability, and adherence to naming conventions used for process steps.

While conventional LcNc tools can provide automated suggestions for adding integration process steps, there is currently no static analysis provided for aspects of iFlows (for example, process steps) with respect to performance, reusability, and readability degradation or naming convention adherence.

Described is a static check framework for LcNc tools that can statically analyze iFlows and provide pointers on incorrect usage of iFlow steps that might degrade an overall LcNc flow and provide suggestions on appropriate corrective steps. While the focus of this disclosure is on cloud-computing iFlow development, applicability to aspects of iFlow development for other applications, data and processes will be apparent to one of ordinary skill in the art and are considered to be within the scope of this disclosure.

In the described methodology, during an iFlow development phase, the described framework will statically analyze iFlows and provide statistics regarding possible (among other things) inefficient, low performance, and/or unreadable flows. In some implementations, the addition of static (that is, hard-coded) checks for process steps can be performed. In some implementations, training of a ML-based model based on existing published content can also be performed and leveraged with respect to process steps. There is a large amount of published content available with respect to cloud-computing integration and best practices, and this content is manually used by developers to generate proposals for next possible steps while creating new iFlows.

The described methodology leverages the published content to train a ML model for static analysis. Since, the existing published flows have already been analyzed by experts for best practices during the publishing process, leveraging prior expert analysis is prudent and efficient use of available resources and effort.

As an example, the described methodology can generate a plurality of iFlows with all possible process steps in a random order. The same iFlows can then be tested against a mass data set (such as, a mass data set stored in a test repository). In some implementations, the test repository can be a database, flat file, or collection of data. The results can be used for performance testing of iFlows and in analyzing possible combinations of process steps causing performance bottlenecks. In some implementations, the mass data set can be prepared using sampling techniques with an existing data set to produce data according to a provided input/output context. In some implementations, an entity (for example, an edmx file defining an entity data model, describing a target database schema, and defining a mapping between the entity data model and the database) structure of input and output is evaluated and data for the mass data set is generated using the sampling techniques.

In some implementations, a ML model can be trained using the performance testing and analysis results. During static analysis, the ML model can be leveraged to propose solutions for issues related to performance degradation.

The described methodology includes two aspects: 1) generation of performance recommendations and 2) Intelligent Suggestions for Performance Improvement.

Generation of Performance Recommendations

In generation of performance recommendations, at a high-level, existing repositories of published integration content is used as input to generate a plurality of iFlows with different permutations and combinations. The generated iFlows are used to compute and output intelligent suggestions (for example, a new iFlow or modifications to an in-work iFlow) with respect to performance (for example, performance bottlenecks) while users create new iFlows.

Turning now to FIG. 1, FIG. 1 is a flow chart illustrating an example of a computer-implemented method 100 for generation of performance recommendations, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, published iFlows are collected. In some implementations, iFlows can be collected from internal or external databases. From 102, method 100 proceeds to 104. From 102, method 100 proceeds to 104.

At 104, descriptions of the collected published iFlows are extracted. In some implementations, the published iFlows are have descriptions in extractable markup language (XML). In some implementations, the descriptions of the published iFlows can be in other representations or languages. From 104, method 100 proceeds to 106.

At 106, the extracted descriptions are parsed. In some implementations, the parsing includes one or more operations, such as:
a) Creating a list of all the operators used in each of the iFlows.
b) Creating a list of a probable configuration of each operator and probability of the configuration. For example: 1) whether a parallel process is used in a Splitter operation; 2) a number of parallel processes in the Splitter operation; 3) authentication used for different types of Connectors; and 4) a timeout parameter used for hypertext transfer protocol (HTTP)/open data protocol (OData) connections.
c) Creating a list containing a next two probable operators and probability for each of the operators.

Table 1 illustrates an example, in some implementations, of a table generated by the parsing of the extracted descriptions, which includes at least the list of operators and other data associated with 106.

TABLE 1

| Operator Index # | Operator | Probable Configuration | Next Operator | $2^{nd}$ Next Operator |
|---|---|---|---|---|
| 1 | Splitter | Parallel Processes (40%) No. of Parallel Process (10 - probability (60%); 5 - probability (20%)) | Process Call (60%) | Gather (40%) Router (30%) |
| 2 | Parallel Process | . . . | . . . | . . . |

From 106, method 100 proceeds to 108.

At 108, using the table created in 106, and test data generated from an automated framework, create a list of interchangeable operator/set of operators according to input-output data results. For example, operators can be selected for the list if the same inputs result in the same outputs. In some implementations, operator sets can include Parallel Multicast vs. Sequential Multicast, General Splitter vs. Iterating Splitter, and PGPEncryptor vs. PKCS7Encryptor. From 108, method 100 proceeds to 110.

At 110, the iFlows are iterated though to generate new iFlows with similar input/output combinations. In some implementations, the iterations includes one or more operations, such as:
a) For a same input/output combination of data, generate a plurality of new iFlows for each permutation and combination. In some implementations, generating a plurality of new iFlows includes: 1) replacing an operator/combination of operators with other operators having a same input/output data result and 2) replacing a configuration according to the list of a most probable configuration.
b) Compute performance parameters and performance bottlenecks for newly generated iFlows and the original iFlow using automatically generated test data (such as the previously described mass data set stored in the test repository). For example: throughput, runtime, data size limits, and memory overflow (user inputs or predefined inputs). In some implementations, computing performance parameters and performance bottlenecks includes: 1) using test data generated with a sampling technique; 2) identifying which iFlows/components of iFlows are problematic with high data load; 3) identifying patterns of components in problematic iFlows; and 4) adding the problematic combination in list of recommendation for combinations to avoid.
c) Choosing an iFlow which fulfills a maximum of performance requirements or an iFlow with most efficient values for performance parameters. In some implementations, the non-selected iFlows can be indicated as non-recommended and will not be reconsidered. In some implementations, non-selected iFlows can be eventually cleared for reconsideration, for example based on time, changes to attributes of the original iFlow, or other criteria.
d) Calculating delta details between published iFlow and the iFlow chosen in c).
e) Storing information about delta details for user reference.

From 110, method 100 proceeds to 112.

At 112, the delta details are used to provide automatic recommendations to users to improve performance of new iFlows being created. The delta details can be used to inform the user to help avoid performance bottlenecks and inconsistencies (for example, feedback, informational message, guidelines, or suggestions to use a different operator). After 112, method 100 can stop.

Figure 2:
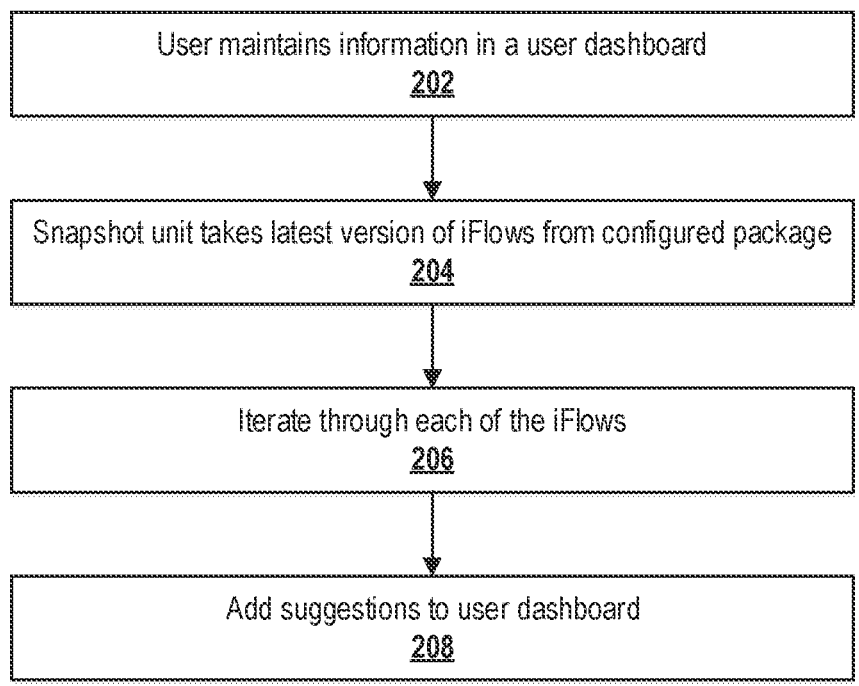
FIG. 2 is a flow chart illustrating an example of a computer-implemented method for providing intelligent recommendations for performance improvement, according to an implementation of the present disclosure.

FIG. 2 is a flow chart illustrating an example of a computer-implemented method 200 for providing intelligent recommendations for performance improvement, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 100 can be run in parallel, in combination, in loops, or in any order.

At 202, a user can maintain information in a user dashboard. In some implementations, the user dashboard can be a graphical user interface displayed on a computer display. In some implementations, the information can include: 1) a GIT-type repository of iFlows; 2) an integration package to check for performance improvements and to generate recommendations; and 3) manual static checks, for example: a) a number of loops, parameter names, security checks in a script (for example; a groovy script; Perl script, JavaScript, other computing language; recommended authentication types for various connectors (for example, an HTTP connection); and a number of routers connected in a single branch of an iFlow). In performing the manual static checks, software code describing iFlows does not need to be executed, but checks can be performed on the software code to determine, among other things, performance, reusability, and readability. From 202, method 200 proceeds to 204.

At 204, a snapshot unit receives the latest version of iFlows from a configured package. In some implementations, a configured package is a collection of iFlows grouped together. In some implementations, the snapshot unit stores the latest iFlow versions and performs the previously described parsing operations in 106 of FIG. 1. From 204, method 200 proceeds to 206.

At 206, each iFlow is iterated. In some implementations, iterating each iFlow includes: 1) parsing the description of the iFlow; 2) determining a set of published iFlows most similar to a desired new iFlow. In some implementations a cluster algorithm (for example, K-means or other clustering algorithm) can be used; and 3) iterating through a resulting set of published iFlows from 2). In some implementations, the iterating includes: a) using a performance recommender to search for the delta details is a published iFlow and b) adding optimization suggestions (that is, the original operator/set of operators versus the determined optimized operators in 110 of FIG. 1 to a list of performance improvement recommendations. From 206, method 200 proceeds to 208.

At 208, the performance improvement recommendations are added to the user dashboard. In some implementations, aspects in the user dashboard can also include readability, reusability, or other aspects to improve/optimize iFlows.

After 220, method 200 can stop.

Figure 3:
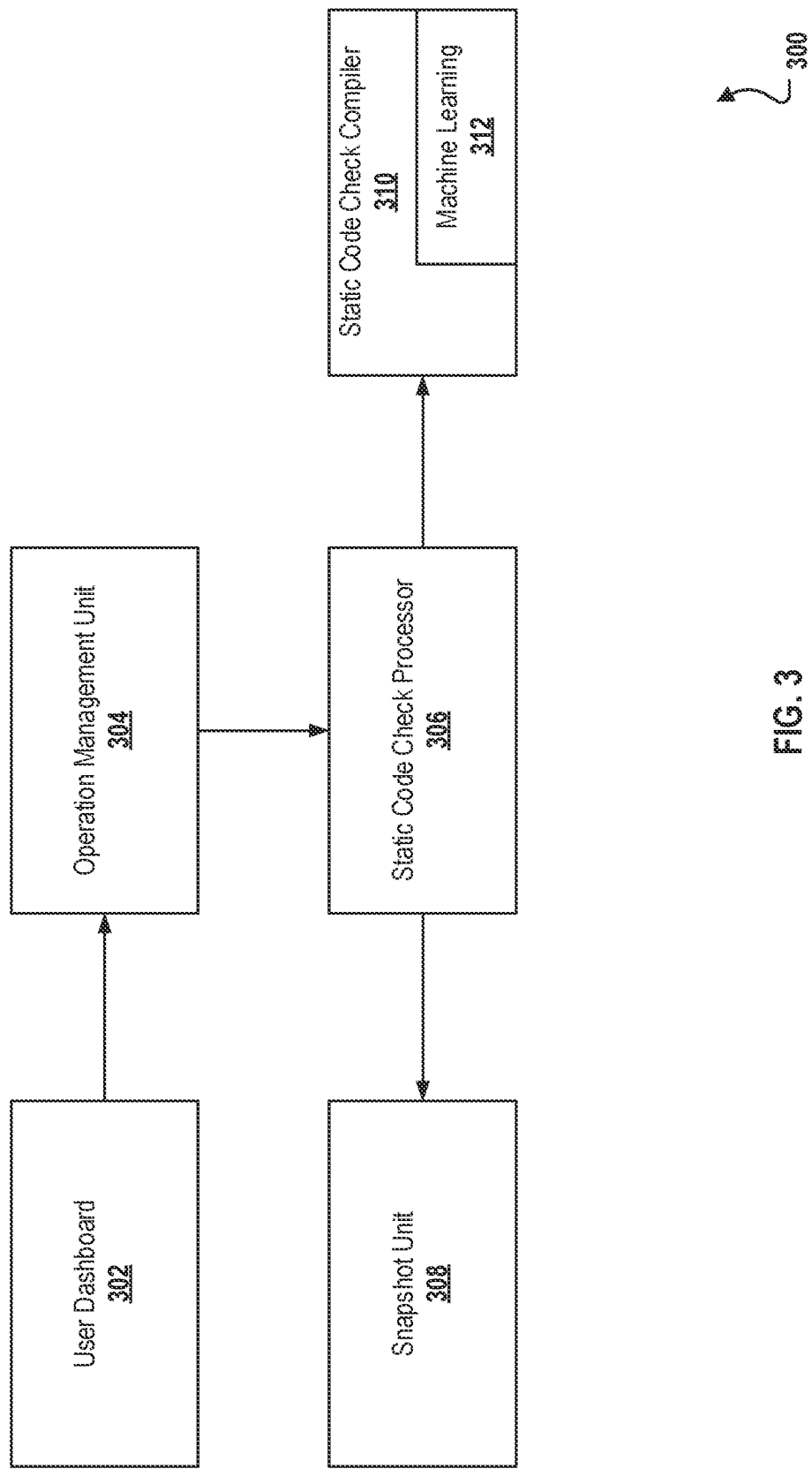
FIG. 3 is a block diagram of a computer implemented system for providing intelligent recommendations for performance improvement, according to an implementation of the present disclosure.

FIG. 3 is a block diagram of a computer-implemented system 300 for providing intelligent recommendations for performance improvement, according to an implementation of the present disclosure. The computer-implemented system 300 includes a user dashboard 302, operation management unit 304, static code check processor 306, a snapshot unit 308, and a static code check compiler 310 with a machine learning 312 submodule.

In some implementations, user dashboard 302 can be a graphical user interface displayed on a computer display. The user dashboard 302 is used to create and update iFlows. The user dashboard 302 can be used to manage static checks. The user dashboard 302 can also be used to call the operations management unit 304 to perform all operations/actions.

The operation management unit 304 is the general backend handler for all operations related to iFlows, which includes, among other things, create, save, update, and test. With respect to static checks, the operation management unit 304 interacts with the static code check processor.

The static code check processor 306 is the main backend module for static check evaluations. The static code check processor 306 fetches iFlow data from the snapshot unit 308 and leverages the static code check compiler 310 to evaluate the iFlow using ML with the machine learning 312 submodule. Snapshot unit 308 stores iFlow data for use by the described approach. In some implementations, the machine learning 312 submodule can be a module separate from the static code check compiler 310 and interacting with one or more elements of the described computer-implemented system 300 or other computer-implemented system.

Figure 4:
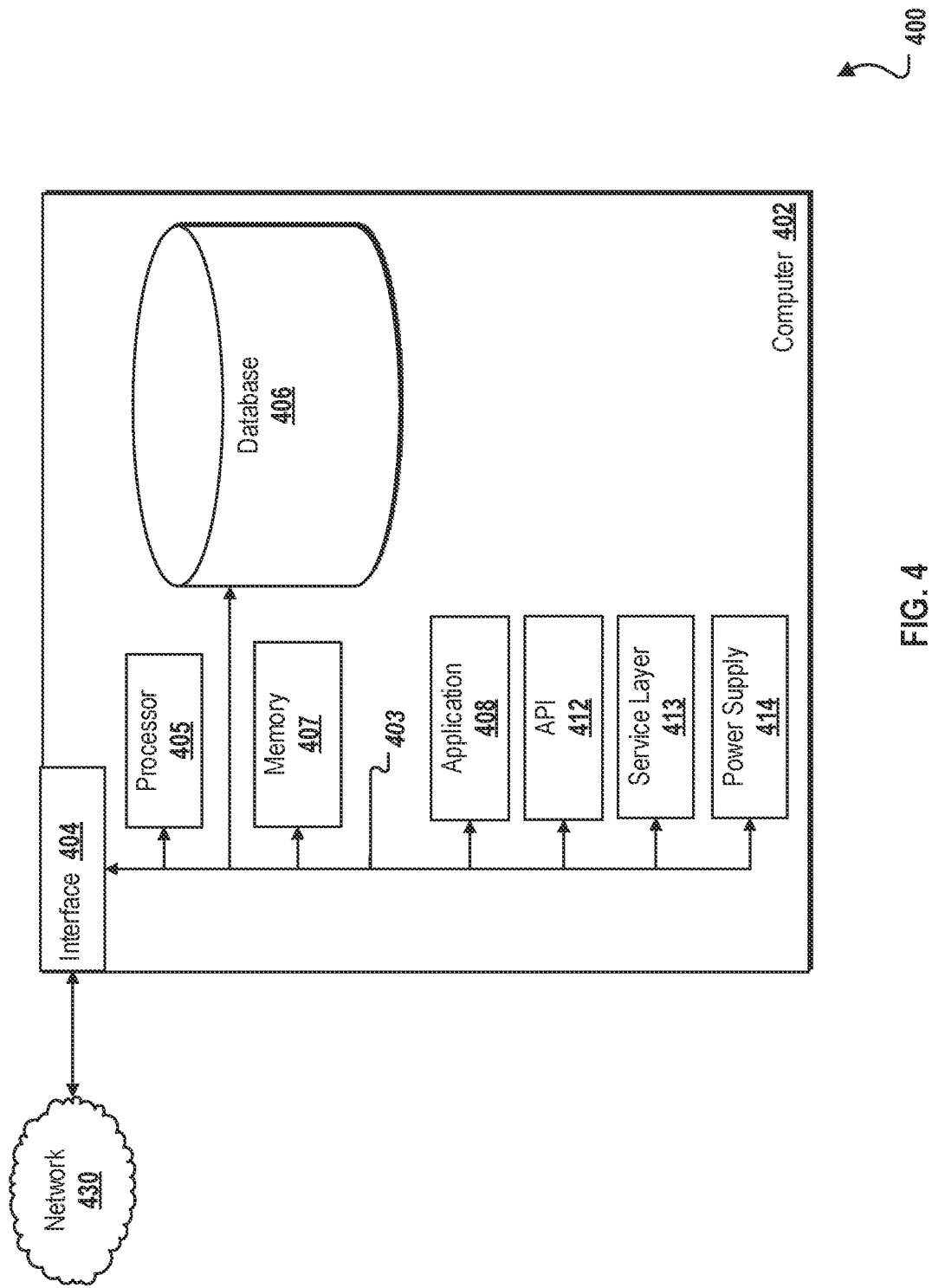
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. The Database 406 can hold and operate on at least any data type mentioned or any data type consistent with this disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user-or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprising: collecting, as collected iFlows, published iFlows; extracting, as extracted descriptions, descriptions of the collected iFlows; parsing the extracted descriptions; creating a list of one or more interchangeable operators; iterating through the collected iFlows; and providing automated performance recommendations for a new iFlow.

The foregoing and other described implementations can each, optionally, include one or more of the following features:

A first feature, combinable with any of the following features, wherein parsing the extracted descriptions, comprises: creating, as an operator list, a list of all operators used in each iFlow of the collected iFlows; creating, using the operator list, a log of a probable configuration of each operator and a probability of the probable configuration; and creating a list containing a next two probable operators.

A second feature, combinable with any of the previous or following features, comprising: generating a table containing each operator of the operator list, probable configuration of the operator, and the next two probably operators.

A third feature, combinable with any of the previous or following features, wherein an operator set of the one or more interchangeable operators can include one or more of Parallel Multicast vs. Sequential Multicast, General Splitter vs. Iterating Splitter, or PGPEncryptor vs. PKCS7Encryptor.

A fourth feature, combinable with any of the previous or following features, wherein iterating through the collected iFlows generates new iFlows with similar input/output combinations.

A fifth feature, combinable with any of the previous or following features, wherein generating a plurality of new iFlows with similar input/output combinations includes: 1) replacing an operator/combination of operators with other operators having a same input/output data result and 2) replacing a configuration according to the list for a most probable configuration.

A sixth feature, combinable with any of the previous or following features, wherein iterating through the collected iFlows: computes performance parameters and performance bottlenecks for newly generated iFlows; chooses, as a chosen iFlow, an iFlow which fulfills a maximum of performance requirements or an iFlows with most efficient values for performance parameters; calculates delta details between a published iFlow and the chosen iFlow; or stores information about delta details for user reference.

In a second implementation, a computer-implemented method, comprising: collecting, as collected iFlows, published iFlows; extracting, as extracted descriptions, descriptions of the collected iFlows; parsing the extracted descriptions; creating a list of one or more interchangeable operators; iterating through the collected iFlows; and providing automated performance recommendations for a new iFlow.

The foregoing and other described implementations can each, optionally, include one or more of the following features:

A first feature, combinable with any of the following features, wherein parsing the extracted descriptions, comprises: creating, as an operator list, a list of all operators used in each iFlow of the collected iFlows; creating, using the operator list, a log of a probable configuration of each operator and a probability of the probable configuration; and creating a list containing a next two probable operators.

A second feature, combinable with any of the previous or following features, comprising: generating a table containing each operator of the operator list, probable configuration of the operator, and the next two probably operators.

A third feature, combinable with any of the previous or following features, wherein an operator set of the one or more interchangeable operators can include one or more of Parallel Multicast vs. Sequential Multicast, General Splitter vs. Iterating Splitter, or PGPEncryptor vs. PKCS7Encryptor.

A fourth feature, combinable with any of the previous or following features, wherein iterating through the collected iFlows generates new iFlows with similar input/output combinations.

A fifth feature, combinable with any of the previous or following features, wherein generating a plurality of new iFlows with similar input/output combinations includes: 1) replacing an operator/combination of operators with other operators having a same input/output data result and 2) replacing a configuration according to the list for a most probable configuration.

A sixth feature, combinable with any of the previous or following features, wherein iterating through the collected iFlows: computes performance parameters and performance bottlenecks for newly generated iFlows; chooses, as a chosen iFlow, an iFlow which fulfills a maximum of performance requirements or an iFlows with most efficient values for performance parameters; calculates delta details between a published iFlow and the chosen iFlow; or stores information about delta details for user reference.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: collecting, as collected iFlows, published iFlows; extracting, as extracted descriptions, descriptions of the collected iFlows; parsing the extracted descriptions; creating a list of one or more interchangeable operators; iterating through the collected iFlows; and providing automated performance recommendations for a new iFlow.

The foregoing and other described implementations can each, optionally, include one or more of the following features:

A first feature, combinable with any of the following features, wherein parsing the extracted descriptions, comprises: creating, as an operator list, a list of all operators used in each iFlow of the collected iFlows; creating, using the operator list, a log of a probable configuration of each operator and a probability of the probable configuration; and creating a list containing a next two probable operators.

A second feature, combinable with any of the previous or following features, comprising: generating a table containing each operator of the operator list, probable configuration of the operator, and the next two probably operators.

A third feature, combinable with any of the previous or following features, wherein an operator set of the one or more interchangeable operators can include one or more of Parallel Multicast vs. Sequential Multicast, General Splitter vs. Iterating Splitter, or PGPEncryptor vs. PKCS7Encryptor.

A fourth feature, combinable with any of the previous or following features, wherein iterating through the collected iFlows generates new iFlows with similar input/output combinations.

A fifth feature, combinable with any of the previous or following features, wherein generating a plurality of new iFlows with similar input/output combinations includes: 1) replacing an operator/combination of operators with other operators having a same input/output data result and 2) replacing a configuration according to the list for a most probable configuration.

A sixth feature, combinable with any of the previous or following features, wherein iterating through the collected iFlows: computes performance parameters and performance bottlenecks for newly generated iFlows; chooses, as a chosen iFlow, an iFlow which fulfills a maximum of performance requirements or an iFlows with most efficient values for performance parameters; calculates delta details between a published iFlow and the chosen iFlow; or stores information about delta details for user reference.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware-or software-based (or a combination of both hardware-and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   collecting, as collected integration flows (iFlows), published iFlows;
   extracting, as extracted descriptions, descriptions of the collected iFlows;
   parsing the extracted descriptions;
   creating a list of one or more interchangeable operators;
   iterating through the collected iFlows, wherein iterating through the collected iFlows:
      computes performance parameters and performance bottlenecks for newly generated iFlows;
      chooses, as a chosen iFlow, an iFlow which fulfills a maximum of performance requirements or an iFlow with most efficient values for performance parameters;
      calculates delta details between a published iFlow and the chosen iFlow; or
      stores information about delta details for user reference; and
   providing automated performance recommendations for a new iFlow.

2. The computer-implemented method of claim 1, wherein parsing the extracted descriptions, comprises:
   creating, as an operator list, a list of all operators used in each iFlow of the collected iFlows;
   creating, using the operator list, a log of a probable configuration of each operator and a probability of the probable configuration; and
   creating a list containing a next two probable operators.

3. The computer-implemented method of claim 2, comprising:
   generating a table containing each operator of the operator list, probable configuration of the operator, and the next two probably operators.

4. The computer-implemented method of claim 1, wherein an operator set of the one or more interchangeable operators can include one or more of Parallel Multicast vs. Sequential Multicast, General Splitter vs. Iterating Splitter, or PGPEncryptor vs. PKCS7Encryptor.

5. The computer-implemented method of claim 1, wherein iterating through the collected iFlows generates new iFlows with similar input/output combinations.

6. The computer-implemented method of claim 5, wherein generating a plurality of new iFlows with similar input/output combinations includes: 1) replacing an operator/combination of operators with other operators having a same input/output data result and 2) replacing a configuration according to the list for a most probable configuration.

7. A non-transitory, computer-readable medium storing one or more instructions executable by a computer system to perform operations comprising:
   collecting, as collected integration flows (iFlows), published iFlows;
   extracting, as extracted descriptions, descriptions of the collected iFlows;
   parsing the extracted descriptions;
   creating a list of one or more interchangeable operators;
   iterating through the collected iFlows, wherein iterating through the collected iFlows:
      computes performance parameters and performance bottlenecks for newly generated iFlows;
      chooses, as a chosen iFlow, an iFlow which fulfills a maximum of performance requirements or an iFlow with most efficient values for performance parameters;

calculates delta details between a published iFlow and the chosen iFlow; or stores information about delta details for user reference; and providing automated performance recommendations for a new iFlow.

8. The non-transitory, computer-readable medium of claim 7, wherein parsing the extracted descriptions, comprises:

creating, as an operator list, a list of all operators used in each iFlow of the collected iFlows;

creating, using the operator list, a log of a probable configuration of each operator and a probability of the probable configuration; and creating a list containing a next two probable operators.

9. The non-transitory, computer-readable medium of claim 8, comprising:

generating a table containing each operator of the operator list, probable configuration of the operator, and the next two probably operators.

10. The non-transitory, computer-readable medium of claim 7, wherein an operator set of the one or more interchangeable operators can include one or more of Parallel Multicast vs. Sequential Multicast, General Splitter vs. Iterating Splitter, or PGPEncryptor vs. PKCS7Encryptor.

11. The non-transitory, computer-readable medium of claim 7, wherein iterating through the collected iFlows generates new iFlows with similar input/output combinations.

12. The non-transitory, computer-readable medium of claim 11, wherein generating a plurality of new iFlows with similar input/output combinations includes:

1) replacing an operator/combination of operators with other operators having a same input/output data result and 2) replacing a configuration according to the list for a most probable configuration.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

collecting, as collected integration flows (iFlows), published iFlows;

extracting, as extracted descriptions, descriptions of the collected iFlows;

parsing the extracted descriptions;

creating a list of one or more interchangeable operators;

iterating through the collected iFlows, wherein iterating through the collected iFlows:

computes performance parameters and performance bottlenecks for newly generated iFlows;

chooses, as a chosen iFlow, an iFlow which fulfills a maximum of performance requirements or an iFlow with most efficient values for performance parameters;

calculates delta details between a published iFlow and the chosen iFlow; or stores information about delta details for user reference; and providing automated performance recommendations for a new iFlow.

14. The computer-implemented system of claim 13, wherein parsing the extracted descriptions, comprises:

creating, as an operator list, a list of all operators used in each iFlow of the collected iFlows;

creating, using the operator list, a log of a probable configuration of each operator and a probability of the probable configuration; and creating a list containing a next two probable operators.

15. The computer-implemented system of claim 14, comprising:

generating a table containing each operator of the operator list, probable configuration of the operator, and the next two probably operators.

16. The computer-implemented system of claim 13, wherein an operator set of the one or more interchangeable operators can include one or more of Parallel Multicast vs. Sequential Multicast, General Splitter vs. Iterating Splitter, or PGPEncryptor vs. PKCS7Encryptor.

17. The computer-implemented system of claim 13, wherein iterating through the collected iFlows generates new iFlows with similar input/output combinations.

18. The computer-implemented system of claim 17, wherein generating a plurality of new iFlows with similar input/output combinations includes:

1) replacing an operator/combination of operators with other operators having a same input/output data result and 2) replacing a configuration according to the list for a most probable configuration.

* * * * *